United States Patent
Cuthbert et al.

(10) Patent No.: US 9,836,456 B2
(45) Date of Patent: Dec. 5, 2017

(54) TECHNIQUES FOR PROVIDING USER IMAGE CAPTURE FEEDBACK FOR IMPROVED MACHINE LANGUAGE TRANSLATION

(71) Applicant: Google Inc., Mountain View, CA (US)

(72) Inventors: Alexander Jay Cuthbert, Oakland, CA (US); Macduff Richard Hughes, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 270 days.

(21) Appl. No.: 14/594,238

(22) Filed: Jan. 12, 2015

(65) Prior Publication Data

US 2016/0203124 A1 Jul. 14, 2016

(51) Int. Cl.
*G06F 17/28* (2006.01)
*G06F 17/21* (2006.01)
(Continued)

(52) U.S. Cl.
CPC .............. *G06F 17/28* (2013.01); *G06F 17/21* (2013.01); *G06F 17/289* (2013.01); *G06F 17/2854* (2013.01); *G06K 9/00671* (2013.01); *G06K 9/033* (2013.01); *G06K 9/20* (2013.01); *G06K 9/726* (2013.01); *G06K 2209/01* (2013.01)

(58) Field of Classification Search
CPC combination set(s) only.
See application file for complete search history.

(56) References Cited

U.S. PATENT DOCUMENTS 8,625,113 B2 1/2014 Keys et al.
8,761,513 B1 6/2014 Rogowski et al.
(Continued)

FOREIGN PATENT DOCUMENTS

EP 2439676 A1 4/2012

OTHER PUBLICATIONS

Fragoso, V. et al., "TranslatAR: A Mobile Augmented Reality Translator," IEEE Workshop on Applications of Computer Vision (WACV 2011), pp. 497-502.
(Continued)

*Primary Examiner* — Paras D Shah
*Assistant Examiner* — Shreyans Patel
(74) *Attorney, Agent, or Firm* — RMCK Law Group, PLC (57) ABSTRACT

A computer-implemented technique includes techniques are presented for user image capture feedback for improved machine language translation. When machine language translation of OCR text obtained from an initial image has a low degree of likelihood of being an appropriate translation, these techniques provide for user image capture feedback to obtain additional images to obtain a modified OCR text, which can result in improved machine language translation results. Instead of user image capture feedback, the techniques may obtain the modified OCR text by selecting another possible OCR text from the initial OCR operation. In addition to additional image capturing, light source intensity and/or a quantity/number of light source flashes can be adjusted. After obtaining the modified OCR text, another machine language translation can be obtained and, if it has a high enough degree of likelihood, it can then be output to a user.

33 Claims, 3 Drawing Sheets

(51) Int. Cl.
*G06K 9/20* (2006.01)
*G06K 9/72* (2006.01)
*G06K 9/00* (2006.01)
*G06K 9/03* (2006.01)

(56) References Cited

U.S. PATENT DOCUMENTS

| | | | |
|---|---|---|---|
| 8,804,029 B2 | 8/2014 | Brown et al. | |
| 8,805,125 B1* | 8/2014 | Kumar | G06Q 20/34 |
| | | | 382/309 |
| 8,879,783 B1* | 11/2014 | Wang | G06K 7/10 |
| | | | 382/100 |
| 8,903,136 B1* | 12/2014 | Wang | G06K 9/00463 |
| | | | 382/112 |
| 2003/0200078 A1* | 10/2003 | Luo | G06F 17/2863 |
| | | | 704/2 |
| 2006/0217958 A1* | 9/2006 | Tagawa | G06F 17/2827 |
| | | | 704/2 |
| 2006/0245005 A1 | 11/2006 | Hall et al. | |
| 2008/0273796 A1* | 11/2008 | Kansal | G06K 9/325 |
| | | | 382/176 |
| 2011/0044554 A1 | 2/2011 | Tian et al. | |
| 2011/0096983 A1 | 4/2011 | Jensen | |
| 2011/0313754 A1* | 12/2011 | Bastide | G06F 17/289 |
| | | | 704/2 |
| 2014/0278430 A1* | 9/2014 | Wexler | G06F 3/011 |
| | | | 704/260 |

OTHER PUBLICATIONS

PCT International Search Report and Written Opinion dated Apr. 28, 2016 for PCT International Application No. PCT/US2016/012843, 12 pages.

Toselli, A. et al., "Chapter 6: Interactive Machine Translation," pp. 135-152 and "Chapter 12: Interactive Machine Translation," pp. 243-246, Multimodal Interactive Pattern Recognition and Applications, Springer-Verlag London Limited, 2011.

* cited by examiner

TECHNIQUES FOR PROVIDING USER IMAGE CAPTURE FEEDBACK FOR IMPROVED MACHINE LANGUAGE TRANSLATION

FIELD

The present disclosure generally relates to mobile computing devices and, more particularly, to techniques for providing image capture feedback to a user for improved machine language translation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Optical character recognition (OCR) involves the detection of a text in an image using a computing device, e.g., a mobile phone. More specifically, OCR involves obtaining a machine-encoded representation of a text in an image ("OCR text"). OCR can provide for a faster way to obtain the OCR text in this digital form at a user device, as opposed to the manual input of the text by a user. After obtaining the OCR text, the OCR text can be utilized in various ways. For example, the OCR text may be processed by a computing device, stored at a memory, and/or transmitted to another computing device. One example of processing the OCR text is performing machine language translation, which involves translating the OCR text from a source language to a different target language using a computing device, such as a server.

SUMMARY

A computer-implemented technique includes receiving, at a computing system having one or more processors, a first image of an object comprising a text in a source language, the first image being captured by a camera in communication with the computing system, performing, by the computing system, optical character recognition (OCR) on the first image to obtain an OCR text that is a machine-encoded text representation of the text, obtaining, by the computing system, a first translated OCR text and a translation score indicative of a degree of likelihood that the first translated OCR text is an appropriate translation of the OCR text to a target language, and when the translation score is less than a translation score threshold indicative of an acceptable degree of likelihood: outputting, by the computing system, a user instruction to capture a set of second images of at least a portion of the object using the camera, receiving, at the computing system, the set of second images, performing, by the computing system, OCR on at least one of the set of second images to obtain a modified OCR text corresponding to the text, in response to obtaining the modified OCR text, obtaining, by the computing system, a second translated OCR text representing a translation of the modified OCR text from the source language to the target language, and outputting, by the computing system, the second translated OCR text.

A computing system having one or more processors configured to perform operations (e.g., the technique) is also presented. The operations can include: receiving a first image of an object comprising a text in a source language, the first image being captured by a camera in communication with the computing system, performing optical character recognition (OCR) on the first image to obtain an OCR text that is a machine-encoded text representation of the text, obtaining a first translated OCR text and a translation score indicative of a degree of likelihood that the first translated OCR text is an appropriate translation of the OCR text to a target language, and when the translation score is less than a translation score threshold indicative of an acceptable degree of likelihood: outputting a user instruction to capture a set of second images of at least a portion of the object using the camera, receiving the set of second images, performing OCR on at least one of the set of second images to obtain a modified OCR text corresponding to the text, in response to obtaining the modified OCR text, obtaining a second translated OCR text representing a translation of the modified OCR text from the source language to the target language, and outputting the second translated OCR text.

In some embodiments, the technique further comprises capturing, by the computing system, the first image and the set of second images using the camera. In some embodiments, the technique further comprises when translation score is less than the translation score threshold, adjusting, by the computing system, an intensity of a light source associated with the camera while capturing the second set of images, the light source being in communication with the computing system. In some embodiments, the technique further comprises when the translation score is less than the translation score threshold, adjusting, by the computing system, a number of flashes of a light source associated with the camera while capturing the second set of images, the light source being in communication with the computing system.

In some embodiments, the technique further comprises when the translation score is less than the translation score threshold, identifying, by the computing system, a portion of the first image causing the OCR text and the corresponding first translated OCR text to have the translation score less than the translation score threshold, wherein the user instruction is to capture the set of second images with respect to the identified portion of the first image. In some embodiments, performing OCR on at least one of the set of second images to obtain a modified OCR text corresponding to the text comprises: combining portions of at least two of the first image and the set of second images to obtain a combined image, and performing OCR on the combined image to obtain the modified OCR text.

In some embodiments, performing OCR on the first image to obtain the OCR text includes: performing, by the computing system, OCR on the first image to obtain a set of possible OCR texts, wherein each possible OCR text has a corresponding OCR score indicative of a degree of likelihood that the possible OCR text is the text, and selecting, by the computing system, the possible OCR text having a highest corresponding OCR score relative to the OCR scores of the other possible OCR texts to obtain the OCR text. In some embodiments, the technique further comprises when the translation score is less than the translation score threshold, selecting, by the computing system, another one of the possible OCR texts to obtain the modified OCR text. In some embodiments, the other one of the possible OCR texts has a second highest corresponding OCR score relative to the OCR scores of the other possible OCR texts.

Another computed-implemented technique is also presented. The technique can include receiving, at a computing system having one or more processors, a first image of an object comprising a text in a source language, the first image being captured by a camera in communication with the computing system, performing, by the computing system, OCR on the first image to obtain a set of possible OCR texts, wherein each possible OCR text has a corresponding OCR score indicative of a degree of likelihood that the possible OCR text is the text, selecting, by the computing system, the possible OCR text having a highest corresponding OCR score relative to the OCR scores of the other possible OCR texts to obtain an OCR text, and when the OCR score of the OCR text less than an OCR score threshold indicative of an acceptable degree of likelihood: outputting, by the computing system, a user instruction to capture a set of second images of at least a portion of the object using the camera, receiving, at the computing system, the set of second images, performing, by the computing system, OCR on at least one of the set of second images to obtain a modified OCR text corresponding to the text, and outputting, by the computing system, the modified OCR text.

Another computing system having one or more processors configured to perform operations (e.g., the technique) is also presented. The operations can include receiving a first image of an object comprising a text in a source language, the first image being captured by a camera in communication with the computing system, performing OCR on the first image to obtain a set of possible OCR texts, wherein each possible OCR text has a corresponding OCR score indicative of a degree of likelihood that the possible OCR text is the text, selecting the possible OCR text having a highest corresponding OCR score relative to the OCR scores of the other possible OCR texts to obtain an OCR text, and when the OCR score of the OCR text less than an OCR score threshold indicative of an acceptable degree of likelihood: outputting a user instruction to capture a set of second images of at least a portion of the object using the camera, receiving the set of second images, performing OCR on at least one of the set of second images to obtain a modified OCR text corresponding to the text, and outputting the modified OCR text.

In some embodiments, the technique further comprises capturing, by the computing system, the first image and the set of second images using the camera. In some embodiments, the technique further comprises when the OCR score is less than the OCR score threshold, adjusting, by the computing system, an intensity of a light source associated with the camera while capturing the second set of images, the light source being in communication with the computing system. In some embodiments, the technique further comprises when the OCR score is less than the OCR score threshold, adjusting, by the computing system, a number of flashes of a light source associated with the camera while capturing the second set of images, the light source being in communication with the computing system.

In some embodiments, the technique further comprises when the translation score is less than the translation score threshold, identifying, by the computing system, a portion of the first image causing the OCR score to be less than the OCR score threshold, wherein the user instruction is to capture the set of second images with respect to the identified portion of the first image. In some embodiments, performing OCR on at least one of the set of second images to obtain a modified OCR text corresponding to the text comprises: combining portions of at least two of the first image and the set of second images to obtain a combined image, and performing OCR on the combined image to obtain the modified OCR text.

In some embodiments, the technique further comprises when the OCR score is less than the OCR score threshold, selecting, by the computing system, another one of the possible OCR texts to obtain the modified OCR text. In some embodiments, the other one of the possible OCR texts has a second highest corresponding OCR score relative to the OCR scores of the other possible OCR texts.

In some embodiments, the technique further comprises obtaining, by the computing system, a first translated OCR text and a translation score indicative of a degree of likelihood that the first translated OCR text is an appropriate translation of the OCR text to a target language, and when the translation score is less than a translation score threshold indicative of an acceptable degree of likelihood, outputting, by the computing system, the user instruction to capture the set of second images of at least a portion of the object using the camera.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously discussed, optical character recognition (OCR) involves obtaining a machine-encoded representation of a text in an image ("OCR text"). Conditions such as image capture angle and lighting, however, can affect the OCR text obtained by performing OCR on the image. For example only, some characters may have inadequate lighting, and thus the OCR text may include an incorrect or missing character from the text. Errors in the OCR text can be difficult to determine, and these errors can propagate to and affect subsequent machine language translation operations. Additional images at different image capture angles and/or different lighting may be obtained to correct the errors in the OCR text. The user, however, needs specific instructions as to how to capture these additional images. Additionally or alternatively, machine language translation results can be fed back into the OCR process to correct the errors in the OCR text. Accordingly, techniques are presented for user image capture feedback for improved machine language translation.

When machine language translation of OCR text obtained from an initial image has a low degree of likelihood of being an appropriate translation, these techniques provide for user image capture feedback to obtain additional images to obtain a modified OCR text, which can result in improved machine language translation results. Instead of user image capture feedback, the techniques may obtain the modified OCR text by selecting another possible OCR text from the initial OCR operation. In some implementations, the techniques involve adjusting operation of a light source during this additional image capturing, such as by adjusting light source intensity and/or a quantity/number of light source flashes. In some implementations, portions of these additional images (and, in some cases, a portion of an initial image) may be combined to create a combined image on which OCR is then performed. After obtaining the modified OCR text, another machine language translation can be obtained and, if it has a high enough degree of likelihood, it can then be output to a user.

Figure 1:
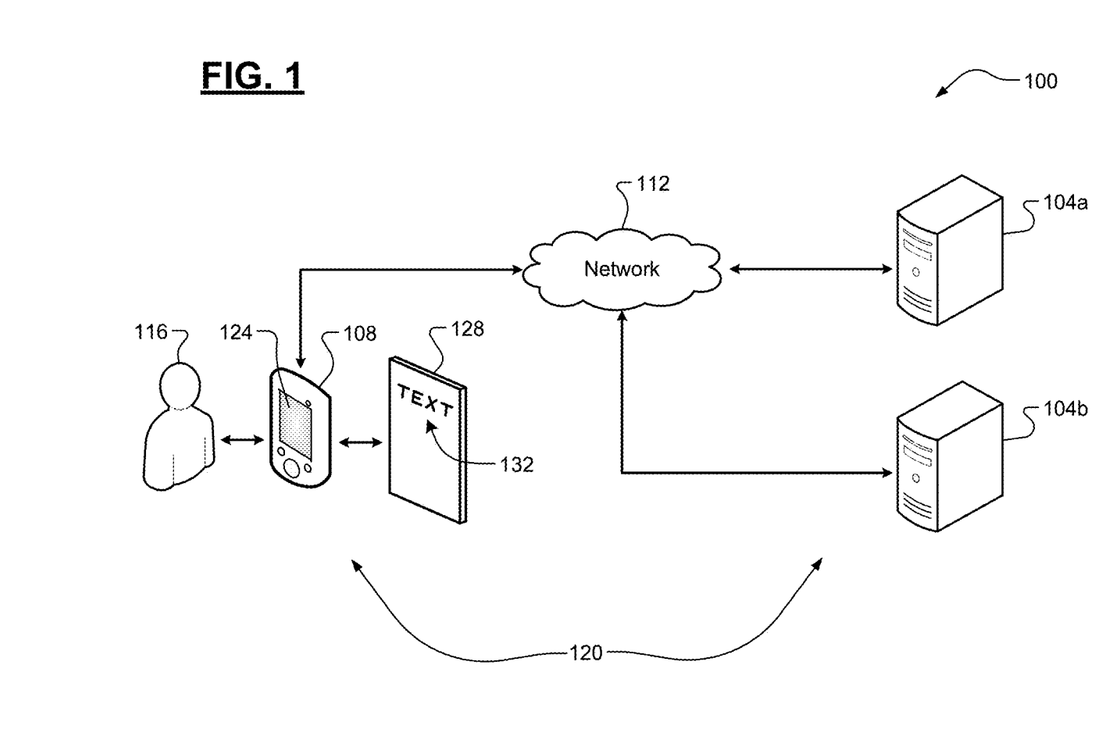
FIG. 1 is a functional block diagram of a computing network including an example mobile computing device according to some implementations of the present disclosure.

Referring now to FIG. 1, a computing network 100 is illustrated. The computing network 100 includes server devices 104a and 104b (collectively "server devices 104"). For example only, server device 104a may be an OCR server device and server device 104b may be a machine language translation server device. It should be appreciated, however, that the term "server device" as used herein can refer to both a single hardware computer server device and a plurality of similar server devices operating in a parallel or distributed architecture. In some implementations, a mobile computing device 108 can be configured to locally perform some or all of the OCR and/or the machine language translation. For example only, the mobile computing device 108 may perform OCR locally and one of the server devices 104 may perform at least a portion of the machine language translation of the OCR text. Thus, the term "computing system 120" can include any combination of some or all of the server devices 104 and the mobile computing device 108.

The mobile computing device 108 is configured to communicate with the server devices 104 via a network 112. Examples of the mobile computing device 108 include a laptop computer, a tablet computer, a mobile phone, and wearable technology, such as a smartwatch, eyewear, or other wearable objects that incorporate a computing device. It should be appreciated, however, that the techniques of the present disclosure could be implemented at any computing device having a display and a camera, e.g., a desktop computer. The network 112 can include a local area network (LAN), a wide area network (WAN), e.g., the Internet, or a combination thereof. The mobile computing device 108 can be associated with a user 116. For example, the user 116 can interact with the mobile computing device 108 via a display 124, e.g., a touch display.

The user 116 can use the mobile computing device 108 to interact with an object 128 having a text 132 thereon. The object 128 can be any object suitable to display the text 132, including, but not limited to, a document, a sign, an advertisement, and a menu. For example, the user 116 may command the mobile computing device 108 to capture an image of the object 128 and its text 132 using a camera 212 and a light source 216 (see FIG. 2) associated with the mobile computing device 108. OCR can be performed on the image to obtain the OCR text. After obtaining the OCR text, the OCR text can then be translated from its source language to a target language, such as a language understood/spoken by the user 116.

Figure 2:
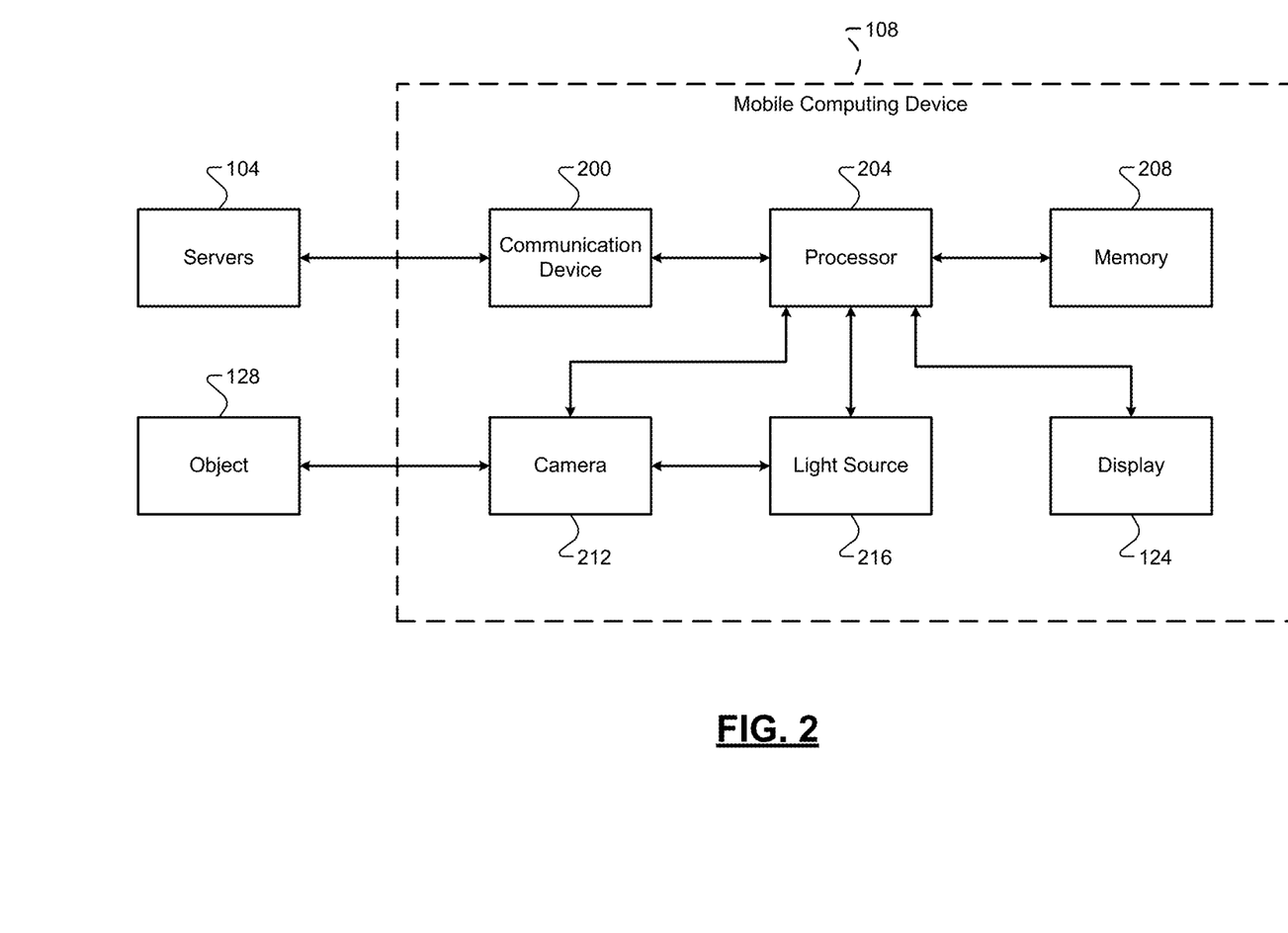
FIG. 2 is a functional block diagram of the example mobile computing device of FIG. 1.

Referring now to FIG. 2, a functional block diagram of the example mobile computing device 108 is illustrated. The mobile computing device 108 can include the display 124, a communication device 200, a processor 204, a memory 208, the camera 212, and the light source 216. It should be appreciated that the mobile computing device 108 can also include other suitable components, such as physical buttons, a microphone, and a speaker. The communication device 200 can include any suitable components (such as a transceiver) that are configured to communicate with other devices, e.g., the server devices 104, via the network 112. The memory 208 can be any suitable storage medium (flash, hard disk, etc.) configured to store information at the mobile computing device 108.

The processor 204 can control operation of the mobile computing device 108. Example functions performed by the processor 204 include, but are not limited to, controlling transmission/reception of information via the communication device 200 and controlling read/write operations at the memory 208. In some implementations, the memory 208 can store a set of instructions that, when executed by the processor 204, causes the processor 204 to perform at least a portion of the operations of the present disclosure. The processor 204 can also process information received from the camera 212 and output information to the display 124.

The camera 212 can be any suitable camera (charge-coupled device (CCD), complimentary metal-oxide-semiconductor (CMOS), etc.) configured to capture an image of the object 128 and its text 132. The light source 216 can be any suitable light source configured to provide a single flash of light or multiple flashes of light during image capture, as well as the ability to vary the light intensity and/or color. In one implementation, the display 124 is a touch display configured to receive input from the user 116. The processor 204 can also be configured to execute at least a portion of the techniques of the present disclosure, which are now discussed in greater detail.

The processor 204 can receive an image of the object 128 and its text 132 from the camera 212. The image can be captured by the camera 212 by the user 116 positioning the camera 212 and providing an input to capture the image, which may include actuating the light source 216. Examples of actuating/controlling the light source 216 can include, but are not limited to, adjusting a quantity/number of flashes by the light source 216 (single flash or multi-flash), an intensity or brightness of the light output by the light source 216, and a color of the light output by the light source 216. This light source control can be performed in conjunction with the camera control, thereby providing for capturing images have varying quality.

While the techniques of the present disclosure may be implemented by only the mobile computing device 108, the techniques will now be discussed in greater detail with respect to the computing system 120. The computing system 120 can initially receive a first image of the object 128 having the text 132. This first image may be captured by the camera 212 of the mobile computing device 108, but another camera associated with the computing system 120 could be used. Each captured image as discussed herein can comprise a single image or multiple images of different qualities. For example, each captured image can comprise a low quality and a high quality image. Low quality image(s) can be used when possible to save processing throughput and/or network bandwidth, and high quality image(s) can be used when the low quality image(s) are insufficient for the techniques of the present disclosure (e.g., OCR text cannot be obtained). The computing system 120 can perform OCR on the first image to obtain an OCR text that is a first machine-encoded representation of the text 132. This OCR operation may be performed locally, remotely (at server device(s) 104), or a combination thereof, and the OCR operation can be performed automatically in response to receiving the first image or in response to a request by the user 116. One example request is to translate the text 132 on the object 128 from its source language to a target language. Depending on a quality of the first image, the OCR text may contain errors and thus may differ from the text 132.

The computing system 120 can obtain a first translated OCR text that is a translation of the OCR text from the source language to the target language. This machine language translation can be performed locally, remotely (at server device(s) 104), or a combination thereof, and may be performed automatically in response to obtaining the OCR text. The first translated OCR text can also have a translation score associated therewith, which can represent a degree of likelihood that the first translated OCR text is an appropriate translation of the OCR text to the target language. For example, during machine language translation, there may be multiple possible first translated OCR texts, and one having a highest relative translation score may be selected. For example only, for possible first translated OCR texts "friend" and "frend," the possible first OCR text "friend" could be selected because it has a higher relative translation score from English to another language, such as French ("ami"). When the OCR text contains errors, this translation score may be relatively low. Thus, the computing system 120 can compare the translation score to a translation score threshold indicative of an acceptable degree of likelihood. While translation scores are discussed in general, there can be translation scores for each word and translation scores for entire phrase blocks. The techniques of the present disclosure can utilize word translation scores, phrase block translation scores, or some combination thereof.

When the translation score is less than the translation score threshold, the computing system 120 can obtain a modified OCR text. In some implementations, the computing system 120 can obtain the modified OCR text by selecting another possible OCR text from the initial OCR operation. More specifically, during the initial OCR operation the computing system 120 may have obtained a set of possible OCR texts each having a corresponding OCR score indicative of a degree of likelihood that the possible OCR text is the text. To obtain the OCR text, the computing system 120 may have selected the possible OCR text having a highest corresponding OCR score relative to the OCR scores of the other possible OCR texts. When the translation score is less than the translation score threshold, the computing system 120 can selected another one of the possible OCR texts to obtain the modified OCR text. In some implementations, the modified OCR text has a second highest corresponding OCR score relative to the OCR scores of the other possible OCR texts. It should be appreciated that the modified OCR text could also be obtained based on other feedback, such translation scores for other possible first translated OCR texts. While OCR scores are discussed in general, there can be OCR scores for individual characters and OCR scores for entire words. The techniques of the present disclosure can utilize character OCR scores, word OCR scores, or some combination thereof.

The modified OCR text can also be obtained by providing feedback to the user 116 regarding how to capture additional images. This feedback is also referred to as user instructions and can include visual information (text, images, or a combination thereof), such as via the display 124 of the mobile computing device 108, and/or audio information. Example user instructions can include an area of the object 128 for capturing additional images or other directional indicators, and a number of additional images to capture. In some implementations, the computing system 120 may identify a portion of the first image causing the OCR text to be incorrect, and the user instruction is to capture the set of second images with respect to the identified portion of the first image. Because humans are often capable of determining which area may being captured at a low quality and thus causing the errors in the OCR text, the user instructions may not need to be overly specific (e.g., recapture the upper-right corner). In some implementations, the user 116 could provide an input (e.g., a tap on the display 124) indicative of a portion of the first image that he/she thinks has a low quality, which can be used by the computing system 120 in making its determinations.

In addition to the user instructions, the computing system 120 can optionally adjust the actuation/control of a light source associated with the camera, such as the light source 216 associated with the camera 212 of the mobile computing device 108. Examples of the light source control include adjusting light source intensity or brightness, adjusting a number of light source flashes (single flash, double flash, triple flash, etc.), and adjusting light source color. One specific example light source control is a gradual increase from no intensity or a low intensity to a high intensity during an image capture period. During the user positioning and the optional light source actuation control, the computing system 120 can receive a set of second images. This set of second images can include one or more images of at least a portion of the object 128 and its text 132. In some implementations, the camera (e.g., camera 212) can capture multiple images as the user 116 positions it to obtain the second set of images, and some images of the second set of images may have a same positioning but different lighting. The user instructions can be provided after the first image is captured and the user 116 is no longer capturing images (after-the-fact) or provided in real-time as the user 116 is still capturing images (e.g., using the camera 212).

In some implementations, in response to receiving the second set of images the computing system 120 can combine or "stitch together" portions of at least two of the first image and the second set of images to obtain a combined image. For example, the first image may have a very low quality and the computing system 120 may combine portions of two or more of the set of second images to obtain the combined image having a higher quality than the first image. Alternatively, for example, only a portion of the first image may have a low quality and thus the computing system 120 may combine a higher quality portion of the first image with portions of one or more of the second set of images to obtain the combined image having a higher overall quality than the first image. In such cases, the computing system 120 can then perform OCR on the combined image to obtain the modified OCR text. Alternatively, the computing system 120 may perform OCR on one of the second set of images to obtain the modified OCR text.

The computing system 120 can obtain a second translated OCR text that is a translation of the modified OCR text from the source language to the target language. Similar to above, this machine language translation can be performed locally, remotely (at server device(s) 104), or a combination thereof, and may be performed automatically in response to obtaining the modified OCR text. The second translated OCR text can also have a translation score associated therewith, which can represent a degree of likelihood that the second translated OCR text is an appropriate translation of the modified OCR text to the target language. The computing system 120 can then output the second translated OCR text for the user 116, such as at the display 124. In some implementations, the computing system 120 can compare the translation score for the second translated OCR text to the translation score threshold. When the translation score is still less than the translation score threshold, the process can be repeated and another modified OCR text can be obtained as discussed above. In such cases, once the translation score for a translated OCR text finally reaches or exceeds the translation score threshold, the translated OCR text can then be output to the user 116.

Figure 3:
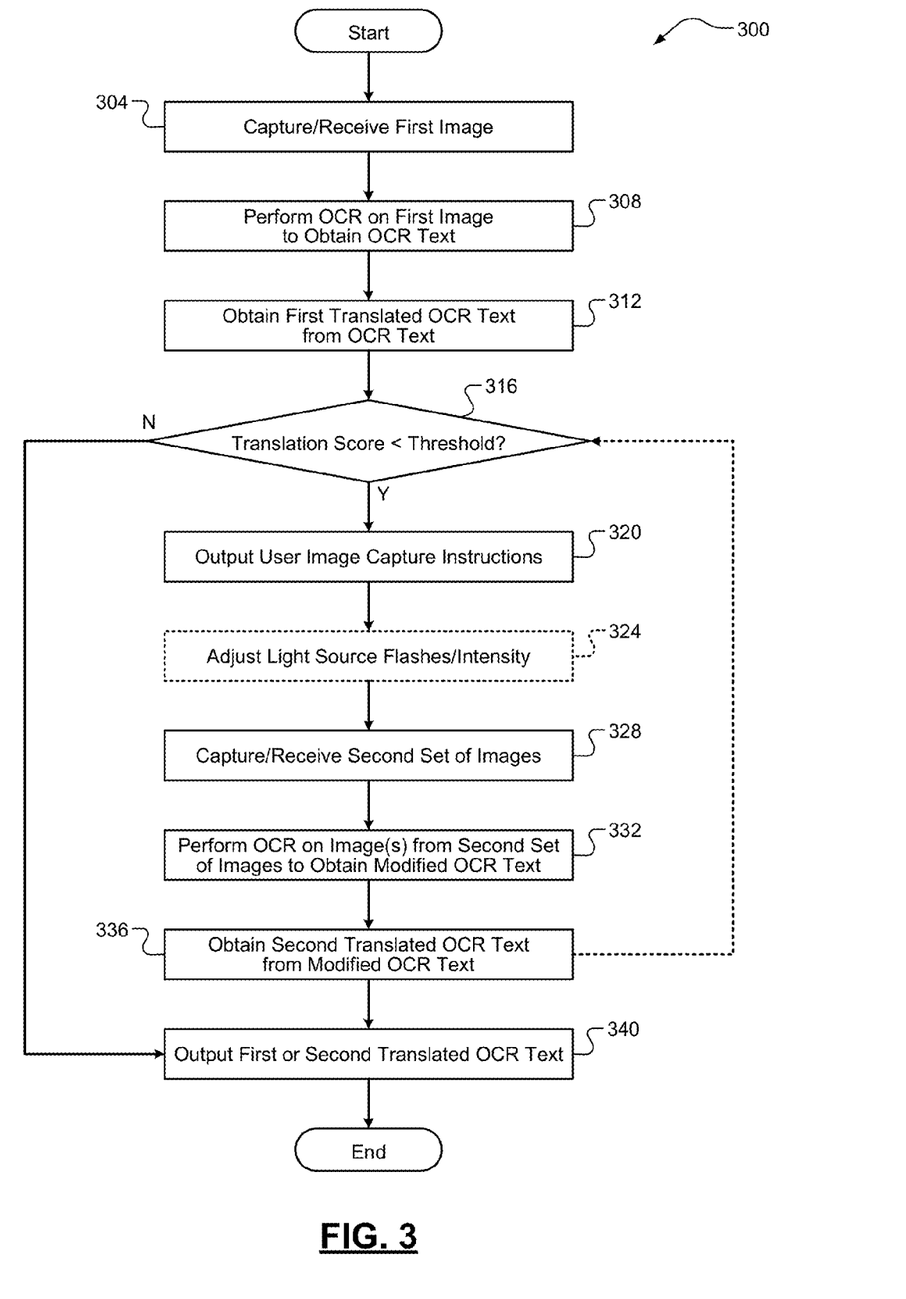
FIG. 3 is a flow diagram of an example technique for providing user image capture feedback for improved machine language translation according to some implementations of the present disclosure.

Referring now to FIG. 3, a flow diagram of an example technique 300 for user image capture feedback for improved machine language translation is illustrated. At 304, the computing system 120 can receive a first image of the object 128 comprising the text 132 in a source language. In some implementations, the first image is captured by a camera in communication with the computing system 120, such as the camera 212 of the mobile computing device 108. At 308, the computing system 120 can perform OCR on the first image to obtain an OCR text that is a machine-encoded text representation of the text 132. In some implementations, this OCR is performed locally at the mobile computing device 108.

At 312, the computing system 120 can obtain a first translated OCR text and a translation score indicative of a degree of likelihood that the first translated OCR text is an appropriate translation of the OCR text to a target language. This translation can be performed at one of the server devices 104, at the mobile computing device 108, or some combination thereof. At 316, the computing system 120 can compare the translation score to a translation score threshold indicative of an acceptable degree of likelihood that the first translated OCR text is an appropriate translation of the OCR text to the target language. When the translation score is greater than or equal to the translation score threshold, the technique 300 can proceed to 340.

When the translation score is less than the translation score threshold, the technique 300 can proceed to 320. At 320, the computing system 120 can output a user instruction to capture a set of second images of at least a portion of the object 128 using the camera associated with the computing system 120, such as the camera 212 of the mobile computing device 108. At 324, the computing system 120 can optionally adjust the quantity/number of flashes and/or an intensity of a light source associated with the camera, such as the light source 216 associated with the camera 212 of the mobile computing device 108. This may help improve a quality of the set of second images, which can result in increased OCR and machine language translation accuracy. At 328, the computing system 120 can receive the set of second images.

At 332, the computing system 120 can perform OCR on at least one of the set of second images to obtain a modified OCR text that is another machine-encoded representation of the text 132. At 336, in response to obtaining the modified OCR text the computing system 120 can obtain a second translated OCR text representing a translation of the modified OCR text from the source language to the target language. In some implementations, a translation score for the second translated OCR text may be less than the translation score threshold, and the technique 300 can return to 320. At 34036, the computing system 120 can output the first or second translated OCR text, depending on the path to 340 in the technique 300. The technique 300 can then end or return to 304.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    capturing, by a camera in electronic communication with a computing system having one or more processors, a first image of an object comprising a text in a source language;
    receiving, at the computing system and from the camera, the first image;
    performing, by the computing system, optical character recognition (OCR) on the first image to obtain an OCR text that is a machine-encoded text representation of the text;
    in response to obtaining the OCR text, automatically obtaining, by the computing system and from a machine translation system, a first translated OCR text and a translation score indicative of a degree of likelihood that the first translated OCR text is an appropriate translation of the OCR text to a target language; and
    when the translation score is less than a translation score threshold indicative of an acceptable degree of likelihood:
        outputting, by the computing system, a user instruction to capture a set of second images of at least a portion of the object using the camera;
        in response to outputting the user instruction, capturing, by the camera, the second set of images;
        receiving, at the computing system and from the camera, the set of second images;
        performing, by the computing system, OCR on at least one of the set of second images to obtain a modified OCR text corresponding to the text;
        in response to obtaining the modified OCR text, obtaining, by the computing system and from the machine translation system, a second translated OCR text representing a translation of the modified OCR text from the source language to the target language; and
        outputting, by the computing system, the second translated OCR text.

2. The computer-implemented method of claim 1, further comprising: when the translation score is less than the translation score threshold, adjusting, by the computing system, an intensity of a light source while capturing the second set of images, the light source being in electronic communication with at least one of the camera and the computing system.

3. The computer-implemented method of claim 1, further comprising: when the translation score is less than the translation score threshold, adjusting, by the computing system, a number of flashes of a light source camera while capturing the second set of images, the light source being in electronic communication with at least one of the camera and the computing system.

4. The computer-implemented method of claim 1, further comprising:
when the translation score is less than the translation score threshold, identifying, by the computing system, a portion of the first image causing the OCR text and the corresponding first translated OCR text to have the translation score less than the translation score threshold, wherein the user instruction is to capture the set of second images with respect to the identified portion of the first image.

5. The computer-implemented method of claim 4, wherein performing OCR on at least one of the set of second images to obtain a modified OCR text corresponding to the text comprises:
combining portions of at least two of the first image and the set of second images to obtain a combined image; and
performing OCR on the combined image to obtain the modified OCR text.

6. The computer-implemented method of claim 1, wherein performing OCR on the first image to obtain the OCR text includes:
performing, by the computing system, OCR on the first image to obtain a set of possible OCR texts, wherein each possible OCR text has a corresponding OCR score indicative of a degree of likelihood that the possible OCR text is the text; and
selecting, by the computing system, the possible OCR text having a highest corresponding OCR score relative to the OCR scores of the other possible OCR texts to obtain the OCR text.

7. The computer-implemented method of claim 6, further comprising when the translation score is less than the translation score threshold, selecting, by the computing system, another one of the possible OCR texts to obtain the modified OCR text.

8. The computer-implemented method of claim 7, wherein the other one of the possible OCR texts has a second highest corresponding OCR score relative to the OCR scores of the other possible OCR texts.

9. The computer-implemented method of claim 1, wherein the camera is a device that is distinct from the one or more processors and a display of the computing system.

10. The computer-implemented method of claim 1, wherein the user instruction further instructs the user to position the camera at a particular position with respect to the object at least one of prior to and while capturing the second set of images.

11. The computer-implemented method of claim 10, wherein the only interaction by the user after the user instruction is output and until the second translated OCR text is output includes the positioning of the camera at the particular position.

12. A computer-implemented method, comprising:
capturing, by a camera in electronic communication with a computing system having one or more processors, a first image of an object comprising a text in a source language;
receiving, at the computing system and from the camera, the first image;
performing, by the computing system, optical character recognition (OCR) on the first image to obtain a set of possible OCR texts, wherein each possible OCR text has a corresponding OCR score indicative of a degree of likelihood that the possible OCR text is the text;
selecting, by the computing system, the possible OCR text having a highest corresponding OCR score relative to the OCR scores of the other possible OCR texts to obtain an OCR text; and
when the OCR score of the OCR text is less than an OCR score threshold indicative of an acceptable degree of likelihood:
outputting, by the computing system, a user instruction to capture a set of second images of at least a portion of the object using the camera;
adjusting, by the computing system, an intensity of a light source while capturing, by the camera, the second set of images to increase a likelihood that an OCR score of a modified OCR text corresponding to the text and obtained from at least one of the second set of images will achieve the OCR score threshold, the light source being in electronic communication with at least one of the camera and the computing system;
receiving, at the computing system and from the camera, the set of second images;
performing, by the computing system, OCR on the at least one of the set of second images to obtain the modified OCR text; and
outputting, by the computing system, the modified OCR text.

13. The computer-implemented method of claim 12, further comprising: when the OCR score is less than the OCR score threshold, adjusting, by the computing system, a number of flashes of the light source while capturing, by the camera, the second set of images to further increase the likelihood that the OCR score of the modified OCR text will achieve the OCR score threshold.

14. The computer-implemented method of claim 12, further comprising:
when the OCR score is less than the OCR score threshold, identifying, by the computing system, a portion of the first image causing the OCR score to be less than the OCR score threshold, wherein the user instruction is to capture the set of second images with respect to the identified portion of the first image.

15. The computer-implemented method of claim 14, wherein performing OCR on at least one of the set of second images to obtain a modified OCR text corresponding to the text comprises:
combining portions of at least two of the first image and the set of second images to obtain a combined image; and
performing OCR on the combined image to obtain the modified OCR text.

16. The computer-implemented method of claim 12, further comprising when the OCR score is less than the OCR score threshold, selecting, by the computing system, another one of the possible OCR texts to obtain the modified OCR text.

17. The computer-implemented method of claim 16, wherein the other one of the possible OCR texts has a second highest corresponding OCR score relative to the OCR scores of the other possible OCR texts.

18. The computer-implemented method of claim 12, further comprising:
obtaining, by the computing system and from a machine translation system, a first translated OCR text and a translation score indicative of a degree of likelihood that the first translated OCR text is an appropriate translation of the OCR text to a target language; and when the translation score is less than a translation score threshold indicative of an acceptable degree of likelihood, outputting, by the computing system, the user instruction to capture the set of second images of at least a portion of the object using the camera.

19. A computing system having one or more processors configured to perform operations comprising:
receiving, from a camera in electronic communication with the computing system, a first image of an object comprising a text in a source language, the first image having been captured by the camera;
performing optical character recognition (OCR) on the first image to obtain an OCR text that is a machine-encoded text representation of the text;
in response to obtaining the OCR text, automatically obtaining, from a machine translation system, a first translated OCR text and a translation score indicative of a degree of likelihood that the first translated OCR text is an appropriate translation of the OCR text to a target language; and
when the translation score is less than a translation score threshold indicative of an acceptable degree of likelihood:
outputting a user instruction to capture a set of second images of at least a portion of the object using the camera;
receiving, from the camera, the set of second images;
performing OCR on at least one of the set of second images to obtain a modified OCR text corresponding to the text;
in response to obtaining the modified OCR text, obtaining, from the machine translation system, a second translated OCR text representing a translation of the modified OCR text from the source language to the target language; and
outputting the second translated OCR text.

20. The computing system of claim 19, wherein the operations further comprise: when the translation score is less than the translation score threshold, adjusting an intensity of a light source while capturing the second set of images, the light source being in electronic communication with at least one of the camera and the computing system.

21. The computing system of claim 19, wherein the operations further comprise: when the translation score is less than the translation score threshold, adjusting a number of flashes of a light source while capturing the second set of images, the light source being in electronic communication with at least one of the camera and the computing system.

22. The computing system of claim 19, wherein the operations further comprise:
when the translation score is less than the translation score threshold, identifying a portion of the first image causing the OCR text and the corresponding first translated OCR text to have the translation score less than the translation score threshold, wherein the user instruction is to capture the set of second images with respect to the identified portion of the first image.

23. The computing system of claim 22, wherein performing OCR on at least one of the set of second images to obtain a modified OCR text corresponding to the text comprises:
combining portions of at least two of the first image and the set of second images to obtain a combined image; and
performing OCR on the combined image to obtain the modified OCR text.

24. The computing system of claim 19, wherein performing OCR on the first image to obtain the OCR text includes:
performing OCR on the first image to obtain a set of possible OCR texts, wherein each possible OCR text has a corresponding OCR score indicative of a degree of likelihood that the possible OCR text is the text; and
selecting the possible OCR text having a highest corresponding OCR score relative to the OCR scores of the other possible OCR texts to obtain the OCR text.

25. The computing system of claim 24, wherein the operations further comprise when the translation score is less than the translation score threshold, selecting, by the computing system, another one of the possible OCR texts to obtain the modified OCR text.

26. The computing system of claim 25, wherein the other one of the possible OCR texts has a second highest corresponding OCR score relative to the OCR scores of the other possible OCR texts.

27. A computing system having one or more processors configured to perform operations comprising:
receiving, from a camera in electronic communication with the computing system, a first image of an object comprising a text in a source language, the first image having been captured by the camera;
performing optical character recognition (OCR) on the first image to obtain a set of possible OCR texts, wherein each possible OCR text has a corresponding OCR score indicative of a degree of likelihood that the possible OCR text is the text;
selecting the possible OCR text having a highest corresponding OCR score relative to the OCR scores of the other possible OCR texts to obtain an OCR text; and
when the OCR score of the OCR text is less than an OCR score threshold indicative of an acceptable degree of likelihood:
outputting a user instruction to capture a set of second images of at least a portion of the object using the camera;
adjusting a number of flashes of a light source while capturing, by the camera, the second set of images to increase a likelihood that an OCR score of a modified OCR text corresponding to the text and obtained from at least one of the second set of images will achieve the OCR score threshold, the light source being in electronic communication with at least one of the camera and the computing system;
receiving, from the camera, the set of second images;
performing OCR on the at least one of the set of second images to obtain the modified OCR text; and
outputting the modified OCR text.

28. The computing system of claim 27, wherein the operations further comprise: when the OCR score is less than the OCR score threshold, adjusting an intensity of the light source while capturing, by the camera, the second set of images to further increase the likelihood that the OCR score of the modified OCR text will achieve the OCR score threshold.

29. The computing system of claim 27, wherein the operations further comprise:
when the OCR score is less than the OCR score threshold, identifying a portion of the first image causing the OCR score to be less than the OCR score threshold, wherein the user instruction is to capture the set of second images with respect to the identified portion of the first image.

30. The computing system of claim 29, wherein performing OCR on at least one of the set of second images to obtain a modified OCR text corresponding to the text comprises:
   combining portions of at least two of the first image and the set of second images to obtain a combined image; and
   performing OCR on the combined image to obtain the modified OCR text.

31. The computing system of claim 27, wherein the operations further comprise when the OCR score is less than the OCR score threshold, selecting another one of the possible OCR texts to obtain the modified OCR text.

32. The computing system of claim 31, wherein the other one of the possible OCR texts has a second highest corresponding OCR score relative to the OCR scores of the other possible OCR texts.

33. The computing system of claim 27, wherein the operations further comprise:
   obtaining, from a machine translation system, a first translated OCR text and a translation score indicative of a degree of likelihood that the first translated OCR text is an appropriate translation of the OCR text to a target language; and
   when the translation score is less than a translation score threshold indicative of an acceptable degree of likelihood, outputting the user instruction to capture the set of second images of at least a portion of the object using the camera.

* * * * *